United States Patent
Legoubin et al.

(10) Patent No.: US 9,882,329 B2
(45) Date of Patent: Jan. 30, 2018

(54) ROTATING CONTACTOR FOR A MOTOR VEHICLE STEERING COLUMN

(71) Applicant: SC2N, Creteil (FR)

(72) Inventors: Joel Legoubin, Créteil (FR); Patrick Noel, Créteil (FR)

(73) Assignee: SC2N, Creteil (FR)

(*) Notice: Subject to any disclaimer, the term of this patent is extended or adjusted under 35 U.S.C. 154(b) by 94 days.

(21) Appl. No.: 14/898,550

(22) PCT Filed: Jun. 27, 2014

(86) PCT No.: PCT/FR2014/000149
§ 371 (c)(1),
(2) Date: Apr. 7, 2016

(87) PCT Pub. No.: WO2014/207327
PCT Pub. Date: Dec. 31, 2014

(65) Prior Publication Data
US 2016/0211633 A1    Jul. 21, 2016

(51) Int. Cl.
*B60R 16/027* (2006.01)
*H01R 35/02* (2006.01)
(Continued)

(52) U.S. Cl.
CPC ......... *H01R 35/025* (2013.01); *B60R 16/027* (2013.01); *B64D 37/08* (2013.01); *F16L 23/024* (2013.01); *F16L 33/02* (2013.01)

(58) Field of Classification Search
CPC .... H01R 35/025; B60R 16/027; B64D 37/08; F16L 23/024; F16L 33/02; B62D 15/0215;
(Continued)

(56) References Cited

U.S. PATENT DOCUMENTS

| 5,314,344 A | 5/1994 | Ida et al. |
| 6,367,337 B1 * | 4/2002 | Schlabach ............... B62D 6/10 180/443 |

(Continued)

FOREIGN PATENT DOCUMENTS

| EP | 0 860 330 A2 | 8/1998 |
| EP | 2 182 594 A1 | 5/2010 |

(Continued)

OTHER PUBLICATIONS

Machine translation of FR 2939737 (available Jun. 18, 2010).*
International Search Report issued in corresponding application No. PCT/FR2014/000149 dated Nov. 12, 2014 (2 pages).

*Primary Examiner* — Renee S Luebke
*Assistant Examiner* — Paul Baillargeon
(74) *Attorney, Agent, or Firm* — Osha Liang LLP (57) ABSTRACT

A rotating contactor for a motor vehicle steering column, including at least one flexible electrical connecting tape, means for winding/unwinding the flexible tape having a plurality of tracks, a cassette that can be mounted on the steering column, a stationary part, and a moving part that can be rotatably connected to the steering wheel of the vehicle, and defining, with the stationary part, a housing for the flexible tape and the tracks. The stationary part of the cassette has a viewing window, and one of the tracks is differentiated and has at least one portion designed to be arranged substantially across from the viewing window of the cassette when the rotating contactor is in the neutral position.

8 Claims, 5 Drawing Sheets

(51) Int. Cl.
  *F16L 23/024* (2006.01)
  *F16L 33/02* (2006.01)
  *B64D 37/08* (2006.01)

(58) Field of Classification Search
  CPC .............. B62D 15/022; B62D 15/0225; B62D 15/023; B62D 15/0235; B62D 15/0245
  USPC .................................................. 439/15, 164
  See application file for complete search history.

(56) References Cited

U.S. PATENT DOCUMENTS

| | | | | |
|---|---|---|---|---|
| 6,471,529 | B2 * | 10/2002 | Oishi .................... | B60R 16/027 |
| | | | | 439/164 |
| 7,462,050 | B2 * | 12/2008 | Yoshimura ............ | B60R 16/027 |
| | | | | 439/164 |
| 2004/0209505 | A1 * | 10/2004 | Wade .................... | B60R 16/027 |
| | | | | 439/164 |
| 2008/0014775 | A1 | 1/2008 | Yoshimura et al. | |

FOREIGN PATENT DOCUMENTS

| | | | |
|---|---|---|---|
| EP | 2 376 312 | B1 | 10/2012 |
| JP | 5-8734 | A | 1/1993 |

* cited by examiner

ROTATING CONTACTOR FOR A MOTOR VEHICLE STEERING COLUMN

This invention relates to rotating contactors for motor vehicles.

The multiplication of the units of the vehicle providing more and more functions partly includes the arrangement of switches behind the steering wheel. These sub-steering wheel switches have an advantage in terms of ergonomics and safety, since they are arranged near the hands of users when they are driving, and can be operated without drivers taking their eyes off the road.

The use of rotating contactors is known for providing sub-steering wheel switches.

Rotating contactors allow one or several devices connected to the vehicle steering wheel to be electrically connected to a main electrical circuit of the vehicle through electrical transmission means. The devices can consist for example of electrical contactors, such as the horn, or of a safety device with an airbag, which inflates in the event of an accident to protect the driver of the vehicle.

To that effect, rotating contactors can incorporate for example at least one electrical connecting band for transmitting current between the main electrical circuit of the vehicle and the devices connected to the steering wheel.

According to a known solution, an electrical connecting band is provided in the form of a flexible tape on which electrical strips are arranged, made for example by means of copper wires encapsulated in a flexible plastic.

The flexible tape or tapes are at least partially wound in a cassette. Tapes for electrical transmission are made in a flexible material in order to be able easily to wind or unwind them inside the cassette.

Such a cassette can incorporate two parts, mounted to move in relation to each other. Usually, one of the parts, called stationary part, is designed to be mounted on the vehicle steering column, while the other part, called moving part, is designed to be rotatably connected to the motor vehicle steering wheel.

It can be a case particularly of a cover and of a casing back, the casing back being integral with the steering column and the cover being rotatably connected to the steering wheel. The rotation of the cover allows the flexible tapes housed in the cassette to be wound or unwound, possibly using winding means.

The stationary and moving parts of the cassette are assembled to move rotationally in relation to each other counter to the flexible electrical connecting tape or tapes.

The extremities of the flexible tape or tapes are then connected to connectors mounted respectively on the stationary part and the moving part of the rotating contactor.

Such a rotating contactor can furthermore incorporate a plurality of tracks for pressing the flexible tape(s) on one hand against an inner face of the stationary part of the cassette, and on the other against an outer face of a component of the moving part of the cassette, and can serve as a guide for winding and unwinding the flexible tape or tapes.

In the aim of compactness, the rotating contactor can be integrated into a switches holder placed behind the steering wheel.

The rotating contactor is generally delivered to the motor vehicle manufacturer to be mounted on the steering column via this switches holder.

To do this, the rotating contactor must be delivered in its neutral or central position in order to make it possible to make, without damaging the contactor, the required number of turns of the steering wheel. To that effect, the parts are usually held in this predetermined position, for example by means of a temporary blocking unit.

For this, it is necessary to identify the position of the rotating contactor in order to place it in its neutral position before temporarily blocking its rotation until it is mounted on the steering column.

To that effect, the use is known of a revolution counter gear whose position is incremented by a driving cog on the moving part of the rotating contactor. However, this solution poses a problem of spatial requirement, since the revolution counter gear and the associated driving cog require space.

Further known is the arrangement, on the moving part of the rotating contactor, of an indicators return cam allowing a radial power take-off, the cam being designed to cooperate with an associated indicator return cog arranged on the switches holder in order to return the indicators to the switched off position during the return movement of the steering wheel following a turn in the direction of the indication.

Due to the spatial requirement problem, it becomes difficult to house both an indicators return cam and a gear driving cog in a confined space on the moving part of the rotating contactor.

It is therefore necessary to enable an identification of the position of the rotating contactor allowing this spatial requirement problem to be remedied.

According to another known solution for identifying the position of the rotating contactor, one of the tracks is differentiated in relation to the other tracks. A transparent cover is then placed above the moving part of the cassette so as to see the differentiated track, and bears marks relating to the number of turns made by the moving part and to the direction of rotation. The differentiated track and the transparent cover are arranged such that when the moving part turns, the differentiated track positions itself substantially at a mark corresponding to the number of turns made by the moving part and to the direction of rotation.

Easy identification of the position of the rotating contactor is therefore obtained, allowing a return in a simple manner to the neutral position of the contactor.

However, the rotating contactor can incorporate a component at least partially opaque, such as a circuit of connecting strips, arranged between the cover of the rotating contactor and the flexible tapes, and the tracks housed in the cassette. This opaque component then prevents viewing of the differentiated track through a transparent cover for rapidly identifying the position of the rotating contactor.

As an example, for functions using a current of a power called high voltage current (several amperes), in particular the horn, the passage of the high voltage current can necessitate an additional contact, in parallel with the rotating contact obtained by means of the flexible tape(s). In this case, the cassette incorporates a stationary wall arranged on the side opposite the stationary casing back of the cassette, and the rotating cover is placed on the stationary wall, and at least one pair of high voltage current connecting strips, of a circular shape, associated with at least one pair of sliding contacts, the strips being supported respectively by a surface of the stationary wall, and the surface of the rotating cover, opposite or vice-versa.

The stationary wall supporting the electrical strips, which is arranged between the casing back accommodating the flexible tape or tapes and the tracks and the rotating cover, is therefore at least partially opaque and prevents rapid reading of the position of the rotating contactor through a transparent cover, which would be placed above the moving part.

The aim of the invention is therefore to provide an optimized rotating contactor allowing rapid identification of the neutral position of the rotating contactor.

In order at least partially to remedy the abovementioned disadvantages, the object of the invention is a rotating contactor for a motor vehicle steering column, comprising:
- at least one flexible electrical connecting tape for powering devices connected to the steering wheel of said vehicle,
- means for winding/unwinding the flexible tape comprising a plurality of tracks for guiding the winding and unwinding of the flexible tape, and
- a cassette that can be mounted on the steering column and comprising:
  - a stationary part, and
  - a part moving relative to the stationary part that can be rotatably connected to the steering wheel of the vehicle, and defining, with the stationary part, a housing for the flexible tape and the tracks, characterized in that:
- the stationary part of the cassette has a viewing window, and in that
- one of the tracks is differentiated and has at least one portion designed to be arranged substantially across from the viewing window of the cassette when the rotating contactor is in the neutral position, the neutral position being a position from which the rotating contactor can be turned in one direction and in the other according to a predefined number of turns.

The rapid identification of the neutral position of the rotating contactor therefore takes place by means of the differentiated track when at least one portion of this differentiated track is visible through the viewing window of the cassette.

According to one aspect of the invention, the stationary part incorporates a casing back that can accommodate the flexible tape and the tracks, and the viewing window is arranged on one portion of the casing back exempt of flexible tape. The presence of the flexible tape accommodated in the casing back does not impede the visibility of the differentiated track, since the viewing window is placed on a portion of the casing back where no tape is interposed between the track and the wall of the casing back.

According to a particular embodiment, the casing back has a back wall and a lateral wall connected to the back wall, and the viewing window is arranged on the lateral wall of the casing back. In particular, the viewing window is arranged "below" the flexible tape, that is to say at the lateral wall close to the back wall of the casing back.

According to another aspect of the invention, the differentiated track is of a different color compared with the other tracks and with the components of the cassette. The color differentiation of the track differentiated in relation to the other tracks and to the rest of the surroundings, namely the cassette and the components housed in the cassette, makes it possible rapidly to interpret whether or not the contactor is in the neutral position.

According to yet another aspect of the invention, the tracks respectively have sections of engagement with a first toothing provided inside the stationary part and with a second toothing provided outside the moving part in order to hold the flexible tape on one hand against an inner face of the stationary part and on the other against an outer face of the moving part.

In particular, the viewing window can be arranged between two teeth of the stationary part. It is in this case that an engagement section of the differentiated track is arranged across from the viewing window when the rotating contactor is in the neutral position.

According to a particular embodiment, the stationary part includes a wall at least partially opaque placed between the tracks and the moving part. The presence of this at least partially opaque wall between the tracks and the moving part does not impede the verification of the position of the rotating contactor through the viewing window.

According to another aspect of the invention, the moving part of the cassette incorporates a rotating cover placed on the wall of the side opposite the casing back.

The rotating cover can incorporate an indicator return cam arranged on the lateral surface of the rotating cover.

The rotating contactor according to the invention can therefore incorporate, in a compact arrangement with a reduced spatial requirement, both the differentiated track and the viewing window at the stationary part, making it possible to distinguish, in a simple and rapid manner, the neutral position of the rotating contactor, and an indicator return cam arranged radially on the moving part, that can cooperate with an indicator return cog in order to return the indicator to the switched off position after the turn.

According to another aspect of the invention, the rotating contactor includes at least one pair of high voltage current connecting strips and at least one pair of sliding contacts, associated with the pair of high voltage current connecting strips, and designed to cooperate with said connecting strips. The pair of high voltage current connecting strips and the pair of sliding contacts are supported on one hand by the at least partially opaque wall and on the other by the moving part opposite the at least partially opaque wall.

The rotating contactor according to the invention furthermore makes it possible to support high voltage current strips separated from low voltage current lines of the flexible tape. This makes it possible to prevent current from being induced in the low voltage current lines by the high voltage current lines, which could for example trigger, in an unwanted manner, a function connected to the steering wheel such as the airbag, thereby adversely affecting driver safety.

Other characteristics and advantages of the invention will emerge more clearly on reading the description below, given as an illustrative and non limitative example, and the attached drawings, among which.

On all the figures, identical components have the same reference numbers.

Figure 1:
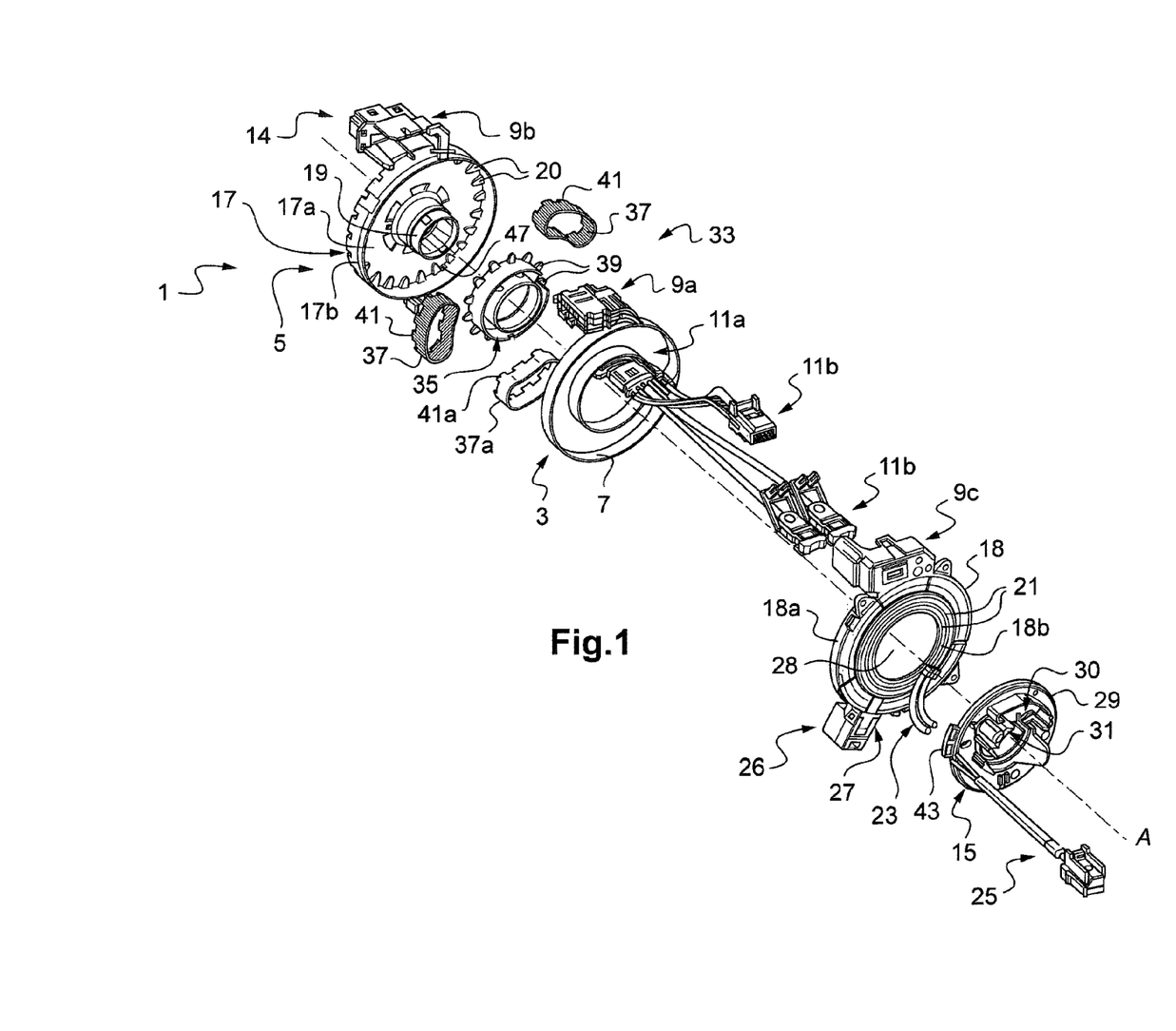
FIG. 1 is an exploded view of a rotating contactor according to the invention.

On FIG. 1, an exploded view is shown of a rotating contactor 1 rotating for a steering column of a motor vehicle (not shown on the figures).

In the continuance of the description, the terms "radial", "axial" and "axially" are used with reference to axis A of the steering column (not shown).

The rotating contactor 1 incorporates electrical transmission means 3 accommodated in a cassette 5 designed to be mounted around the steering column.

The rotating contactor provides, through the electrical transmission means 3, electrical connections, for example, for controlling, from the steering wheel, devices connected to the steering wheel such as an airbag for protecting the driver.

The electrical transmission means 3 incorporate, according to the described embodiment, at least one flexible electrical connecting tape 7.

A flexible tape 7 generally incorporates a plurality of lines of metal electrical conductors, in copper, for example. It can be a case, as an example, of low voltage current lines, that is to say of the order from a few μA to a few amperes, for example, a power supply for the lights of the order of 2 A. The lines of conductors are coated with an electrical insulator such as flexible plastic.

The flexible tape 7 can be wound as a spiral.

The extremities of the flexible tape 7 penetrate into the connectors 9a and 11a that can cooperate with complementary connectors 9b and 11b designed to be connected to the vehicle electrical bundle or to the devices connected to the vehicle steering wheel.

Figure 2:
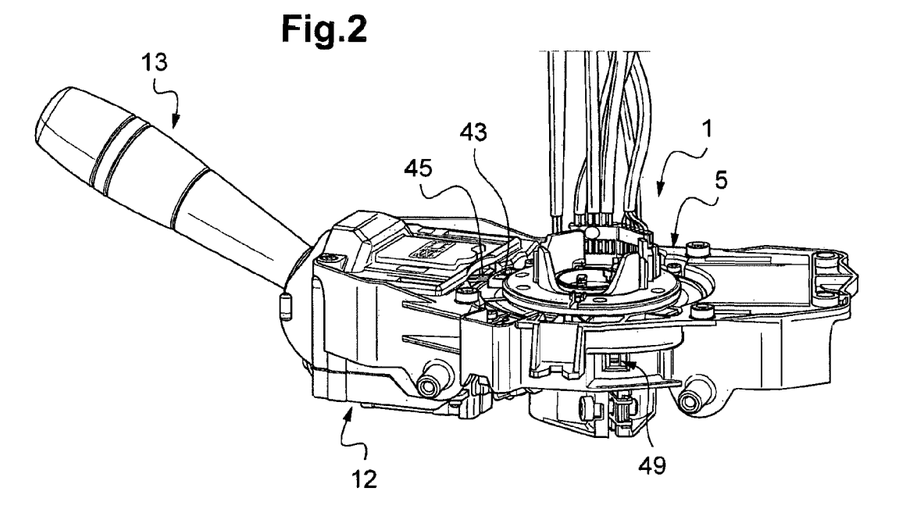
FIG. 2 shows a switches holder supporting the rotating contactor of FIG. 1.
Figure 3:
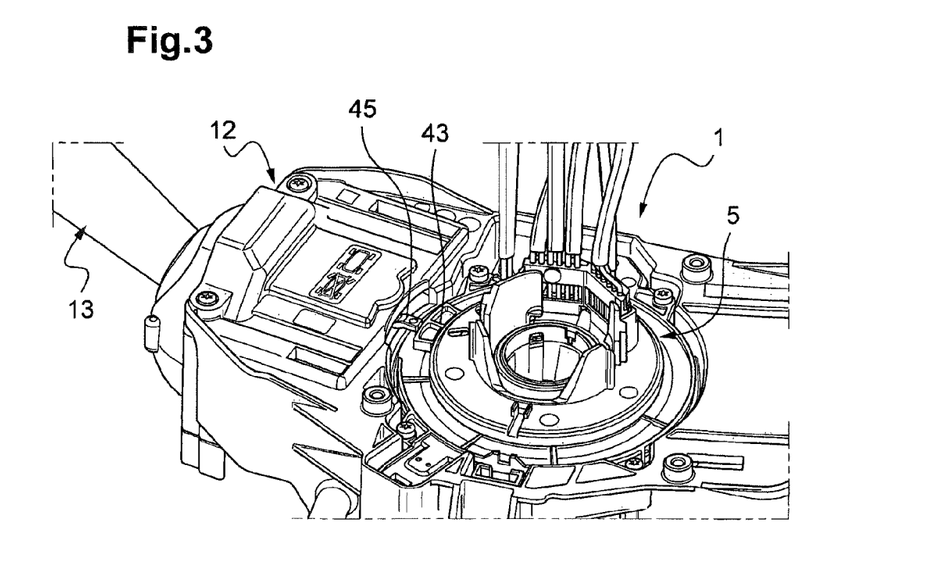
FIG. 3 is a partial view of the switches holder of FIG. 2.

As for the cassette 5, it is designed to be mounted on the steering column (not visible on the figures) via a switches holder 12 shown on FIGS. 2 and 3, designed to be placed behind the steering wheel. This switches holder 12 can be made integral with the steering column, for example with screws or other fastening devices.

The switches holder 12 incorporates, in addition to the rotating contactor 1, switches 13, called sub-steering wheel switches, like those that usually control functions such as the indicators, headlamps and windscreen wiper of the vehicle, but also radio satellites or a cruise control.

The cassette 5 is inserted in a housing having a shape corresponding to the body of the switches holder 12, the housing being made for example in a central position, and around which the switches 13 are placed.

Furthermore, referring again to FIG. 1, the cassette 5 incorporates two parts 14, 15, mounted to move in relation to each other with the electrical transmission means 3 intervening between the two parts 14, 15.

More precisely, the cassette 5 incorporates a first stationary part 14, designed to be mounted on the vehicle steering column and a second moving part 15, designed to be rotatably connected to the steering wheel (not shown) of the motor vehicle.

The two parts 14, 15, moving in relation to each other, of the cassette 5 are coaxial according to the described embodiment.

The stationary part 14 and moving part 15 of the cassette 5 move in relation to each other counter to the flexible tape or tapes 7. To that effect, the flexible tape or tapes 7 is/are mounted in a housing defined by the stationary and moving parts 14, 15.

The stationary part 14 incorporates, according to the illustrated embodiment, a casing back 17 that can accommodate the flexible tape(s) 7. More precisely, in this example, the casing back 17 is hollow so as to accommodate the flexible tape or tapes 7.

According to the example shown, the casing back 17 incorporates a back wall 17a substantially circular and a lateral wall 17b connected to the periphery of the back wall 17a.

The casing back 17 can incorporate a central axle 19 through which the steering column (not shown on the figures) can pass.

The stationary part 14 can furthermore incorporate a first toothing 20 arranged here on the inside periphery of the casing back 17.

Moreover, the casing back 17 can support a connector 9b complementary to a connector 9a receiving the extremities of the flexible tape or tapes 7, the connector 9b being designed to be connected to the vehicle electrical bundle. The connector 9b is, for example, oriented substantially axially. The flexible tape or tapes 7 is/are therefore connected to the stationary part 14.

A wall 18, stationary here, at least partially opaque, can be arranged between the casing back 17 and the moving part 15.

The casing back 17 and the stationary wall 18 form, when they are assembled, a partially closed casing in which the flexible tape(s) 7 is/are located.

Furthermore, according to the illustrated embodiment, the stationary wall 18 has
a substantially circular shape complementary to the back wall 17a of the casing back 17.

The stationary wall 18 can support a connector cover 9c complementary to the connector 9a receiving the extremities of the flexible tape or tapes 7 and complementary to the connector 9b. This connector cover 9c can, similarly to the connector 9b, be oriented substantially axially.

Moreover, the stationary wall 18 has two opposite faces 18a, 18b: a first face 18a on the side towards the casing back 17 and a second face 18b on the side away from the casing back 17. The second face 18b, according to the illustrated example, has a surface, substantially flat and perpendicular to the axis A of the steering column (not shown).

According to the illustrated embodiment, the stationary wall 18 supports, on its second face 18b, connecting strips 21, for example printed or compound-filled on the stationary wall 18. The connecting strips 21 are, for example, circular, and can form concentric circles centered on the axis of rotation of the rotor.

Complementary sliding contacts 23, supported on the moving part 15, are arranged opposite the upper face 18b of the stationary wall 18 supporting the connecting strips 21. The sliding contacts 23, according to the illustrated example, are presented in the shape of flexible metal strips, that is to say, elastically deformable in this case, that can be connected by one extremity to the moving part 15, and whose other extremity can slide against the connecting strips 21. In order to obtain sliding, the sliding contacts 23 are compressed against the connecting strips 21, so that the elasticity of the metal strips presses the sliding extremity against the contact strip 21 associated with it.

Of course, other embodiments of the sliding contacts 23 can be considered.

In the embodiment shown, the sliding contacts 23 are connected to high voltage current cables 25, on the side towards the rotor, and the connecting strips 21 are connected to a high voltage current connector 26. This high voltage current connector 26 is presented here in the shape of a plug connector, which is designed to be inserted into a corresponding socket when putting the rotating contactor 1 in place on the switches holder 12.

The plug connector of the high voltage current connector 26 is placed on a radial arm 27 issuing from the stationary wall 18, and is oriented substantially axially.

The high voltage current cables 25 are contacted to units placed behind the steering wheel, for example the horn, or any other device requiring a consistent power supply, such as a steering wheel heater.

A reverse assembly is also possible, in which the sliding contacts 23 are placed on the stationary wall 18, while the connecting strips 21 are supported by the moving part 15. A combination of the two assemblies is likewise possible.

Of course, the wall 18 could, as a variant, support an electric printed circuit board (PCB) holder, or connecting strips to power a device quite other than the horn.

Furthermore, the stationary wall 18 also incorporates a hole 28, substantially central here, for passage of the steering column (not shown).

Figure 4:
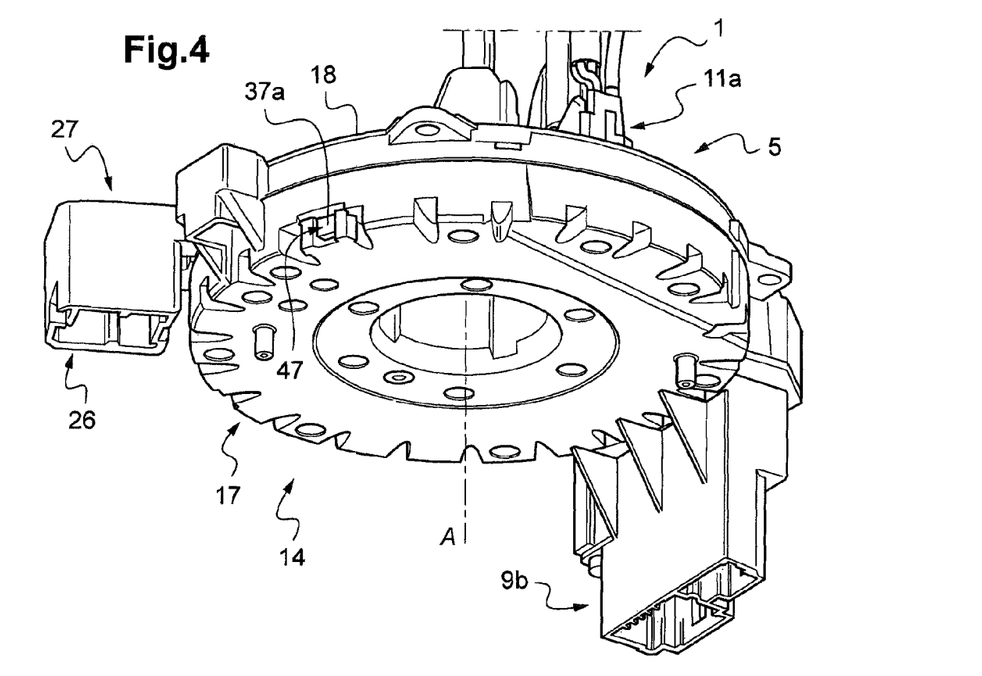
FIG. 4 is a perspective side view of the rotating contactor of FIG. 1 in the assembled state.

Thus, in the assembled state illustrated as a diagram in FIG. 4, the stationary part 14 of the cassette 5 comprising the casing back 17 and the stationary wall 18 has a substantially quoit shape with a central hole through which the vehicle steering column passes.

Referring again to FIG. 1, the moving part 15 for its part incorporates a rotating cover 29 placed on the stationary wall 18.

The rotating cover 29 can be driven in rotation by the vehicle steering wheel (not shown).

The rotating cover 29 has an opening 30 that can receive the connector 11a receiving an extremity of the flexible tape or tapes 7, the connector 11a being designed to be connected to the devices connected to the steering wheel. The flexible tape or tapes 7 is/are therefore connected to the moving part 15.

The rotating cover 29 furthermore has a hole 31, central here, so as to enable the steering column (not visible on the figures) to pass through it.

The central axle 19 of the casing back 17, the central hole 28 of the stationary wall 18 and the central hole 31 of the rotating cover 29 are concentric according to the illustrated example.

The rotating contactor 1 furthermore incorporates means 33 for winding and unwinding the flexible tape or tapes 7.

The winding and unwinding means 33 incorporate, according to the illustrated example, a driving hub 35 and tracks 37, 37a.

The driving hub 35 has a substantially tubular shape and is placed in the cassette 5.

According to the described embodiment, the driving hub 35 is arranged around the central axle 19 of the casing back 17 of the cassette 15.

The tracks 37, 37a can be obtained by means of flexible rings, for example of rubber. According to the illustrated example, the tracks 37, 37a respectively have a closed band shape.

Figure 5:
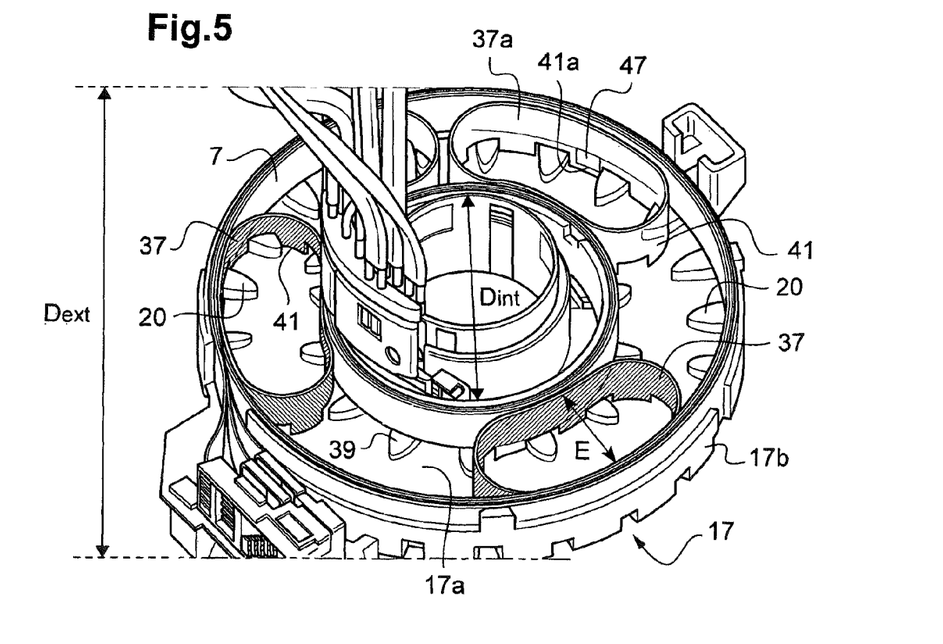
FIG. 5 is a first perspective view of a casing back of a cassette of the rotating contactor accommodating flexible tapes and associated tracks.
Figure 6:
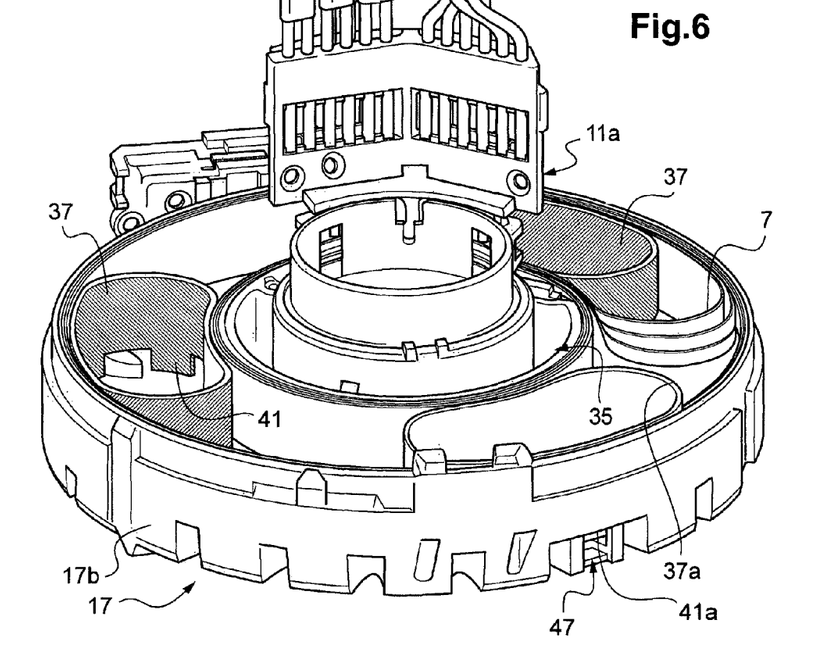
FIG. 6 is a second perspective view of the casing back of FIG. 5.

Moreover, as this is visible on FIGS. 5 and 6, in the assembled state of the rotating contactor 1, the tracks 37, 37a do not come into contact with each other.

The flexible tapes 7 are folded up around the tracks 37, 37a, which form a guide and a support for the flexible tapes 7 during winding/unwinding of the latter when the steering wheel is turned.

To that effect, the tracks 37, 37a are arranged in the casing back 17. The wall 18, at least partially opaque and stationary in this example, is therefore placed between the tracks 37, 37a and the moving part 15, more particularly between the tracks 37, 37a and the rotating cover 29.

More precisely, the tracks 37, 37a are arranged between the windings of the flexible tape or tapes 7 in order to hold the flexible tape 7 on one hand against an inner face of the stationary part 14 and on the other against an outer face of the moving part 15.

According to the illustrated example, in the assembled state of the rotating contactor 1, the tracks 37, 37a can press the flexible tape(s) 7 against the inner face of the lateral wall 17b of the casing back 17 of the stationary part 14, and against the outer face of the driving hub 35 of the moving part 15. The flexible tape(s) 7 then has/have a winding pressed against the inner face of the lateral wall 17b of the casing back 17 and a winding pressed against the outer face of the driving hub 35.

Between the winding of the flexible tape or tapes 7 pressed against the inner face of the casing back 17 and the opposite winding of the flexible tape or tapes 7 pressed against the outer face of the driving hub 35, also referred to as the winding on the stator side and the winding on the rotor side of the flexible tape or tapes 7, a predetermined minimum distance E (see FIG. 5) must be respected. As an example, this distance E can be determined on the basis of the qualities of the material of the tracks 37, 37a provided to guide the winding and unwinding of the flexible tape or tapes 7.

The driving hub 35 can be driven by the rotating cover 29 and can in turn drive the tracks 37, 37a.

To that effect, the driving hub 35 has a second toothing 39 on its outer periphery, and the tracks 37, 37a respectively have a predefined number of engagement sections 41, 41a on the edges of the tracks 37, 37a. The respective engagement sections 41, 41a of the tracks 37, 37a can engage on one hand with the teeth 20 provided on the inner periphery of the casing back 17, that is to say, inside the casing back 17, and on the other with the teeth 39 provided on the outer periphery of the driving hub 35, that is to say outside the driving hub 35 and therefore outside the moving part 15.

The engagement sections 41, 41a of the tracks 37, 37a can have a substantially notched shape.

Moreover, referring again to FIG. 1, the rotating contactor 1 can incorporate an indicator return cam 43 arranged on the lateral surface of the rotating cover 29.

The indicator return cam 43 is presented here in the form of a radial protuberance from the lateral surface of the rotating cover 29. The indicator return cam 43 is made to cooperate with an associated cog 45, visible on FIGS. 2 and 3, in order to return the indicators to the neutral position (that is to say, switched off) during the return movement of the steering wheel following a turn in the direction of the indication.

The indicator return cam 43 can be implemented in a compact assembly without preventing correct functioning of the rotating contactor 1.

Furthermore, it is important to deliver the rotating contactor 1 in a neutral position of the two parts, stationary part 14 and moving part 15 of the cassette 5, making it possible to make the required number of turns, namely at least two and a half turns or at least three and a half turns, in one direction and in the other direction, without damaging the electrical transmission means 3, once the rotating contactor 1 is assembled on the steering column (not shown). This is the position in which the wheels of the vehicle are straight. We also refer later to the "zero" position of the rotating contactor 1.

In fact, this makes it possible to avoid a device connected to the steering wheel, for example an airbag, becoming unserviceable, thereby diminishing safety in the vehicle.

It must therefore be easy to distinguish the position of the rotating contactor before blocking it in its neutral position for delivery to the manufacturer.

For this, one of the tracks 37, 37a is differentiated, track 37a in this case, preferably by a different color compared with the other tracks 37. In the example illustrated on FIGS. 1 and 5 to 8, the differentiated track 37a is white and the other tracks 37 are hatched in black.

The track 37a must also be differentiated in relation to the other components in the cassette 5 and at the cassette 5, particularly by a different color.

As a planned complement or alternative, the differentiated track 37a could also be at least partially transparent.

As a complement, the cassette 5 incorporates a viewing window 47 provided on the stationary part 14, for example on the casing back 17 in this case, so as to see the differentiated track 37a when the rotating contactor 1 is in the neutral position and when it can be turned by the required number of turns in both directions.

The differentiated track 37a can therefore be arranged across from the viewing window 47 when the rotating contactor 1 is in the neutral position.

In fact, the viewing window 47 and the differentiated track 37a are arranged so that the differentiated track 37a can only be located across from the viewing window 47 in the neutral or "zero" position of the rotating contactor 1.

More precisely, the viewing window 47 is made on the lateral wall 17b of the casing back 17 of the cassette 5, more particularly between two teeth 20 of the casing back 17.

An engagement section 41a, substantially notched in this example, of the differentiated track 37a can therefore engage between the two teeth 20 of the casing back 17 that delimit the viewing window 47 when the rotating contactor 1 is in the neutral position. More precisely, the differentiated track 37a is embodied in the form of a closed band in the illustrated example, and it is an engagement section 41a of a longitudinal portion of the differentiated track 37a that is arranged across from the viewing window 47 when the rotating contactor 1 is in the neutral position.

In order to determine the arrangement of the differentiated track 37a, several parameters can be considered, in particular, such as:
- the total number of steering wheel turns, for example ±2.5 turns or 3.5 turns around the neutral or "zero" position of the rotating contactor,
- the diameter of the steering column,
- the minimum distance E between the winding of the flexible tape or tapes 7 pressed against the inner face of the casing back 17 and the opposite winding of the flexible tape or tapes 7 pressed against the outer face of the driving hub 35, and
- the number of moving teeth 39 of the driving hub 35 and the number of stationary teeth 20 of the casing back 17, as will be explained later.

This list of parameters for determining the arrangement of the differentiated track 37a through the viewing window 47 only when the rotating contactor 1 is in the neutral position is not exhaustive.

The number of teeth of the driving hub 35 and of the casing back 17 can be determined on the basis of the diameters $D_{ext}$ of the casing back 17 and $D_{int}$ of the driving hub 35 (FIG. 5).

The diameter $D_{int}$ of the driving hub 35 depends on the diameter of the steering column, generally originating from the specifications of the motor vehicle manufacturer. This is generally therefore an imposed value.

The diameter $D_{ext}$ of the casing back 17 of the cassette 5 can be determined from the diameter $D_{int}$ of the driving hub 35 and from the minimum distance E to be provided between the stator side winding and the rotor side winding of the flexible tape or tapes 7. The relation of the diameter $D_{ext}$ of the casing back 17 of the cassette 5 to the diameter $D_{int}$ of the driving hub 35 should generally be of the order of 2.

The relation of these diameters $D_{int}$ and $D_{ext}$ leads to the determination of the number of teeth 39 of the driving hub 35 of the moving part 15 and of the number of teeth 20 of the casing back 17 of the stationary part 14. In particular, the number of teeth 20 on the casing back 17 and the number of teeth 39 on the outer periphery of the driving hub 35 are whole numbers.

Knowing the number of teeth 20 on the casing back 17 of the cassette 5 and the number of teeth 39 on the driving hub 35, the arrangement of the viewing window 47 on the cassette 5 and the arrangement of the differentiated track 37a can be defined so that the differentiated track 37a is only visible at the viewing window 47 when the rotating contactor 1 is in the neutral or "zero" position.

In particular, the location of the viewing window 47 on the cassette 5 can be chosen.

The location of the viewing window 47 can depend on constraints imposed by the motor vehicle manufacturer. The location of the viewing window 47 depends on the surroundings, in particular, this location of the viewing window 47 must be chosen so as always to be visible when the top of the column is equipped with components such as an angle sensor, connectors, or other components that can mask the rotating contactor 1.

Moreover, the location of the viewing window 47 must be advantageously chosen so as to avoid the operator responsible for assembling the rotating contactor 1 on the switches holder 12 twisting round in order to see through the viewing window 47.

More precisely, the viewing window 47 is made on the lateral wall 17b of the casing back 17 of the cassette 5.

More particularly, the location of the viewing window 47 is chosen according to the illustrated example, between two teeth 20 of the casing back 17.

Finally, with the tracks 37, 37a pressing the flexible tape(s) 7 against the inner face of the lateral wall 17b of the casing back 17, the flexible tape(s) 7 becomes/become interposed between the tracks 37, 37a and the lateral wall 17b of the casing back 17. The viewing window 47 must therefore be arranged on a portion of the lateral wall 17b of the casing back 17 exempt of flexible tape 7, so that no flexible tape 7 is interposed between the viewing window 47 and the differentiated track 37a.

Figure 7:
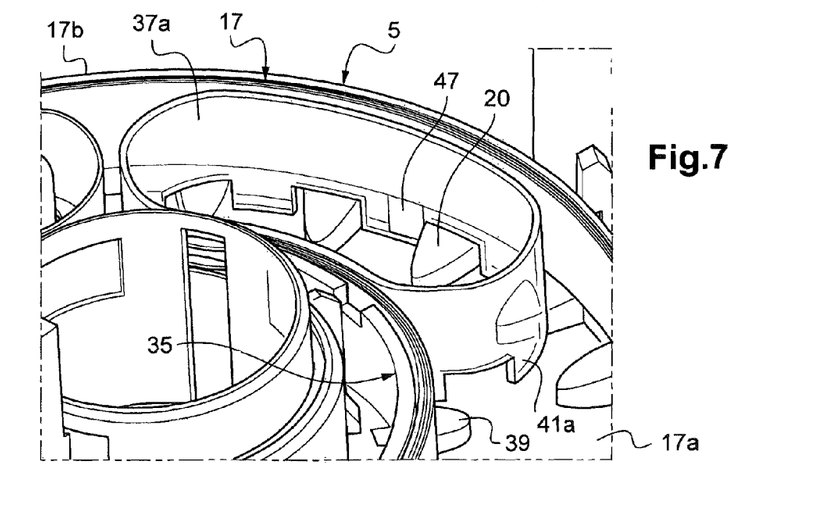
FIG. 7 is a partial view of the casing back of the cassette of FIGS. 5 and 6.

In particular, according to the illustrated embodiment, the viewing window 47 is arranged on the lateral wall 17b under the flexible tape(s) 7, with reference to the orientation of FIGS. 6 and 7, close to the back wall 17a.

Having defined the location of the viewing window 47, the arrangement of the differentiated track 37a can be determined so that the differentiated track 37a is only visible at the viewing window 47 when the rotating contactor 1 is in the neutral or "zero" position.

Figure 8:
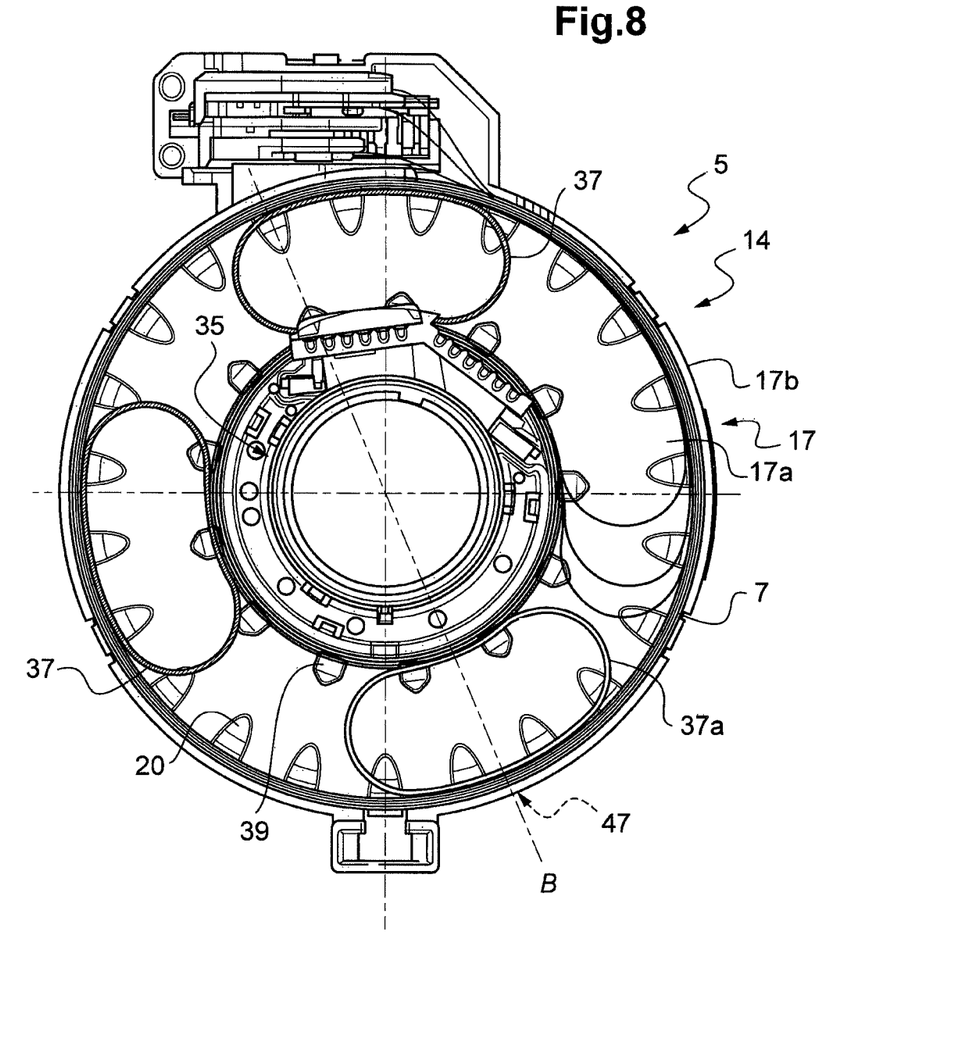
FIG. 8 is a top view of the casing back of FIG. 5, showing, in a diagrammatic manner, an emplacement axis of a differentiated track.

A purely illustrative and non limitative example is shown as a diagram on FIG. 8.

On this FIG. 8, with regard to the constraints imposed by the motor vehicle manufacturer, such as the number of steering wheel turns, the diameter of the steering column (not shown) and if applicable, the desired location for the viewing window 47, and based on the knowledge of the specialist for determining the minimum distance E required between the winding of the flexible tape or tapes 7 pressed on the rotor side and the winding of the flexible tape or tapes 7 pressed on the stator side, the whole and natural number of teeth 39, 20 on one hand for the driving hub 35 and on the other for the casing back 17 can be determined, and the differentiated track 37a must then be placed along a positioning axis B so as to be visible through the viewing window 47 when the rotating contactor 1 is in the neutral position.

The differentiated track 37a can furthermore be arranged so as to be centered on this positioning axis B.

In a very particular case shown on this FIG. 8, at least one tooth 20 of the casing back, which remains stationary and at least one tooth 39 of the driving hub 35, which is therefore moving, are aligned along this positioning axis B in the neutral position of the rotating contactor 1.

Furthermore, an opening 49, visible on FIG. 2, corresponding to the viewing window 47, is made in the switches holder 12 such that the viewing window 47, and therefore the differentiated track 37a, is visible through this corresponding opening 49. The opening 49 in the switches holder 12 is arranged substantially across from the viewing window 47 when the rotating contactor 1 is mounted in the switches holder 12.

It is therefore understood that the differentiated track 37a and the viewing window 47 provided in the cassette 5 allow rapid viewing of the position of the rotating contactor 1. In fact, when this differentiated track 37a is visible through the viewing window 47, the rotating contactor 1 is in the "zero" position and can be mounted around the steering column.

Moreover, the operator can easily check, and without twisting round, the position of the rotating contactor 1 and if necessary, turn the rotating contactor 1 to place it in the neutral position.

Furthermore, this solution does not necessitate marking the flexible tape or tapes in order to detect the position of the rotating contactor 1.

Neither is it necessary to make marks on a transparent cover placed above the moving part in order to detect the position of the rotating contactor.

The solution proposed by the invention is therefore simpler to embody and less costly than certain solutions of the prior art.

Finally, such a rotating contactor 1 has a reduced spatial requirement and a compact assembly, allowing the inclusion particularly of an indicators return cam 43 and a wall 18 supporting connecting strips 21 in order to power with high voltage current a device connected to the steering wheel such as the horn or a steering wheel heater whose high voltage current strips are separate from the low voltage current lines.

The invention claimed is:

1. A rotating contactor for a motor vehicle steering column, comprising:
    at least one flexible electrical connecting tape for powering devices connected to the steering wheel of said vehicle;
    means for winding/unwinding the flexible tape comprising a plurality of tracks for guiding the winding and unwinding of the flexible tape; and
    a cassette that can be mounted on the steering column and comprising:
        a stationary part, and
        a part moving relative to the stationary part that can be rotatably connected to the steering wheel of the vehicle, and defining, with the stationary part, a housing for the flexible tape and the tracks, wherein
    the stationary part of the cassette has a viewing window, and one of the tracks is differentiated and has at least one portion arranged substantially across from the viewing window of the cassette when the rotating contactor is in the neutral position, the neutral position being a position from which the rotating contactor is turned in one direction and in the other according to a predefined number of turns,
    the stationary part incorporates a casing back that can accommodate the flexible tape and the tracks, and in which the viewing window is arranged on one portion of the casing back exempt of flexible tape, and
    the casing back has a back wall and a lateral wall connected to the back wall, and in which the viewing window is arranged on the lateral wall of the casing back.

2. The rotating contactor as claimed in claim 1, in which the differentiated track is of a different color compared with the other tracks and with the stationary part and the part of the cassette.

3. The rotating contactor as claimed in claim 1, in which the tracks respectively have sections of engagement with a first toothing provided inside the stationary part and with a second toothing provided outside the moving part in order to hold the flexible tape on one hand against an inner face of the stationary part and on the other against an outer face of the moving part.

4. The rotating contactor as claimed in claim 3, in which the viewing window is arranged between two teeth of the stationary part.

5. The rotating contactor as claimed in claim 1, in which the stationary part includes a wall at least partially opaque placed between the tracks and the moving part.

6. The rotating contactor as claimed in claim 5, in which the moving part of the cassette incorporates a rotating cover placed on the wall of the side opposite the casing back.

7. The rotating contactor as claimed in claim 6, in which the rotating cover incorporates an indicator return cam arranged on a lateral surface of the rotating cover.

8. The rotating contactor as claimed in claim 5, incorporating at least one pair of high voltage current connecting strips and at least one pair of sliding contacts, associated with the pair of high voltage current connecting strips, and designed to cooperate with said connecting strips, and in which the pair of high voltage current connecting strips and the pair of sliding contacts are supported by the at least partially opaque wall and by the moving part opposite the at least partially opaque wall.

* * * * *

UNITED STATES PATENT AND TRADEMARK OFFICE
CERTIFICATE OF CORRECTION

PATENT NO. : 9,882,329 B2  
APPLICATION NO. : 14/898550  
DATED : January 30, 2018  
INVENTOR(S) : Joel Legoubin et al.

Page 1 of 1

It is certified that error appears in the above-identified patent and that said Letters Patent is hereby corrected as shown below:

On the Title Page

Under item (65) Prior Publication Data, Line 2, insert:  
-- (30) Foreign Application Priority Data  
June 27, 2013   (FR)     13 01515 --.

Signed and Sealed this  
Sixteenth Day of October, 2018

Andrei Iancu  
*Director of the United States Patent and Trademark Office*